(12) United States Patent
Gulersen et al.

(10) Patent No.: US 11,182,967 B2
(45) Date of Patent: Nov. 23, 2021

(54) DEVICES, COMPUTER-READABLE MEDIA, AND SYSTEMS FOR AUGMENTED REALITY OF AVAILABLE RESOURCES

(71) Applicant: Mastercard International Incorporated, Purchase, NY (US)

(72) Inventors: Kobi Gulersen, Toronto (CA); Brian Millar Adair Lang, Toronto (CA)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 16/585,384

(22) Filed: Sep. 27, 2019

(65) Prior Publication Data

US 2020/0105064 A1 Apr. 2, 2020

Related U.S. Application Data

(60) Provisional application No. 62/738,692, filed on Sep. 28, 2018.

(51) Int. Cl.
*G06T 19/00* (2011.01)
*G06Q 20/32* (2012.01)
(Continued)

(52) U.S. Cl.
CPC .......... *G06T 19/006* (2013.01); *G02B 27/017* (2013.01); *G06F 3/011* (2013.01);
(Continued)

(58) Field of Classification Search
None
See application file for complete search history.

(56) References Cited

U.S. PATENT DOCUMENTS 10,121,087 B2* 11/2018 Lee .................... G06K 9/00449
2004/0105126 A1* 6/2004 Minowa ................. G06Q 30/02
358/1.18

(Continued)

FOREIGN PATENT DOCUMENTS

KR 10-1788706 B1 10/2017

OTHER PUBLICATIONS

International Search Report and Written Opinion for Application No. PCT/US2019/053392 dated Jan. 17, 2020 (10 pages).

*Primary Examiner* — Joni Hsu
(74) *Attorney, Agent, or Firm* — Michael Best & Friedrich LLP

(57) ABSTRACT

Devices, computer-readable media, and systems for augmented reality of available resources. In one embodiment, an electronic device includes a camera, a display screen, a memory including at least one of an available resources repository or an options repository, and an electronic processor. The electronic processor is configured to receive an image including a remuneration vehicle from the camera, recognize the remuneration vehicle that is included in the image, generate a graphical user interface including at least one of available resources or one or more options that are associated with remuneration vehicle based on information stored in the at least one of the available resources repository or the options repository, generate an augmented reality image by overlaying the graphical user interface that is generated onto the image from the camera, and control the display screen to display the augmented reality image.

20 Claims, 14 Drawing Sheets

(51) Int. Cl.
*G06K 9/00* (2006.01)
*G06F 3/01* (2006.01)
*G02B 27/01* (2006.01)
*G06T 19/20* (2011.01)
*G06T 11/60* (2006.01)

(52) U.S. Cl.
CPC ......... *G06F 3/017* (2013.01); *G06K 9/00671* (2013.01); *G06Q 20/322* (2013.01); *G06Q 20/326* (2020.05); *G06T 11/60* (2013.01); *G06T 19/20* (2013.01); *G02B 2027/014* (2013.01); *G02B 2027/0138* (2013.01); *G02B 2027/0178* (2013.01)

(56) References Cited

U.S. PATENT DOCUMENTS

| | | | |
|---|---|---|---|
| 2006/0122921 A1* | 6/2006 | Comerford | G06Q 30/0235 705/35 |
| 2007/0135164 A1* | 6/2007 | Lee | G06Q 20/327 455/558 |
| 2013/0290172 A1* | 10/2013 | Mashinsky | G06Q 20/384 705/39 |
| 2014/0006129 A1 | 1/2014 | Heath | |
| 2014/0076965 A1* | 3/2014 | Becorest | G06Q 20/342 235/380 |
| 2014/0281742 A1* | 9/2014 | Probin | G08B 25/10 714/48 |
| 2015/0287076 A1 | 10/2015 | Soon-Shiong | |
| 2015/0379549 A1* | 12/2015 | Hwang | G06Q 30/0267 705/14.27 |
| 2017/0344825 A1 | 11/2017 | Wang et al. | |
| 2018/0174134 A1 | 6/2018 | Carpenter et al. | |
| 2018/0341907 A1* | 11/2018 | Tucker | G06Q 30/0623 |

* cited by examiner

DEVICES, COMPUTER-READABLE MEDIA, AND SYSTEMS FOR AUGMENTED REALITY OF AVAILABLE RESOURCES

CROSS-REFERENCE TO RELATED APPLICATION

This application claims the benefit of U.S. Provisional Application No. 62/738,692, filed on Sep. 28, 2018, the entire content of which is hereby incorporated by reference.

FIELD OF THE INVENTION

The present disclosure relates generally to augmented reality. More specifically, the present disclosure relates to augmented reality of available resources from remuneration vehicles.

BACKGROUND

Conventionally, a remuneration vehicle (e.g., card) issuer sends documentation regarding available resources such as benefits (along with terms and conditions) to a cardholder upon issuance of a card to the cardholder. However, cardholders often find it very difficult to understand the benefits and the terms and conditions. Cardholders have to sift through complex user manuals and websites from the issuers, which is time-consuming and unclear. For example, a cardholder on a trip may need to understand if a card has travel insurance coverage and the extent of the travel insurance coverage.

Conventionally, a cardholder accesses an application or website of a source (e.g., a merchant), card issuer, or third-party transaction tracker to receive digital offers to various merchants. However, like card benefits, cardholders often find it very difficult to understand what options (e.g., digital offers) are available to them across all of the applications and websites for the various merchants, card issuers, or third-party transaction trackers that provide digital offers. Cardholders have to access each application or website individually to determine which digital offer is best for the cardholder. Further, cardholders have to access each application or website individually to determine which digital offer is available locally.

SUMMARY

In some embodiments, the present disclosure addresses the above problems by overlaying a graphical user interface on a camera image of one or more cards (collectively referred to herein as "augmented reality" or "augmented reality image") of a cardholder, where the graphical user interface illustrates information from a central repository for some or all of the cardholder's cards. In one non-limiting example, a cardholder interface device matches an image of one of the cardholder's cards to an image of the same card that is stored in the central repository. Upon matching the image of the cardholder's card to an image of the same card that is stored in the central repository, the central repository outputs the available resources and options associated with that particular card. The cardholder interface device generates a graphical user interface based on the available resources and options associated with that particular card and overlays the graphical user interface on a camera image of the card to generate an augmented reality image. The information illustrated in the augmented reality image thus allows the cardholder to access and view, in one application, various resources and/or options available to the cardholder across one, some or all of the cardholder's various cards (e.g., one or more credit cards, debit cards, prepaid cards, loyalty cards, insurance cards, membership cards, subscription services, or other cards or services that provide benefits).

For example, the cardholder may have several credit cards and each credit card has a travel insurance benefit. The information that is illustrated by the graphical user interface allows the cardholder to access and view the individual benefits of each credit card or a comparison of benefits across several cards.

Additionally or alternatively, the cardholder may have several credit cards and each credit card has different digital offers. The information that is illustrated by the graphical user interface also allows the cardholder to access and view the digital offers of each credit card or an aggregate of digital offers across several cards.

In one embodiment, the present disclosure includes an electronic device. The electronic device includes a camera, a display screen, a memory including at least one of an available resources repository or an options repository, and an electronic processor communicatively connected to the memory, the camera, and the display. The electronic processor is configured to receive an image including a remuneration vehicle from the camera, recognize the remuneration vehicle that is included in the image, generate a graphical user interface including at least one of available resources or one or more options that are associated with remuneration vehicle based on information stored in the at least one of the available resources repository or the options repository, generate an augmented reality image by overlaying the graphical user interface that is generated onto the image from the camera, and control the display screen to display the augmented reality image.

In another embodiment, the present disclosure includes a non-transitory computer-readable medium storing instructions that, when executed by an electronic processor, cause the electronic processor to perform a set of operations. The set of operations includes receiving an image including a remuneration vehicle from a camera. The set of operations includes recognizing the remuneration vehicle that is included in the image. The set of operations includes generating a graphical user interface including at least one of available resources or one or more options that are associated with the remuneration vehicle based on information stored in at least one of an available resources repository in a memory or an options repository in the memory. The set of operations includes generating an augmented reality image by overlaying the graphical user interface that is generated onto the image from the camera. The set of operations also includes sending, to a display screen, the augmented reality image to be displayed.

In yet another embodiment, the present disclosure includes a system including a server and an electronic device. The server includes a first electronic processor and a first memory including a first available resources repository and a first options repository. The electronic device includes a camera, a display screen, a second memory including at least one of a second available resources repository or a second options repository; and a second electronic processor communicatively connected to the second memory, the camera, and the display. The second electronic processor is configured to receive an image including a remuneration vehicle from the camera, recognize the remuneration vehicle that is included in the image, generate a graphical user interface including at least one of available resources or one or more options that are associated with remuneration vehicle based on information stored in the at least one of the available resources repository or the options repository, generate an augmented reality image by overlaying the graphical user interface that is generated onto the image from the camera, and control the display screen to display the augmented reality image. Further, the at least one of the second available resources repository or the second options repository includes a portion of information stored in the first available resources repository or the first options repository.

DETAILED DESCRIPTION

Before any embodiments of the present disclosure are explained in detail, it is to be understood that the present disclosure is not limited in its application to the details of construction and the arrangement of components set forth in the following description or illustrated in the following drawings. The present disclosure is capable of other embodiments and of being practiced or of being carried out in various ways.

Figure 1:
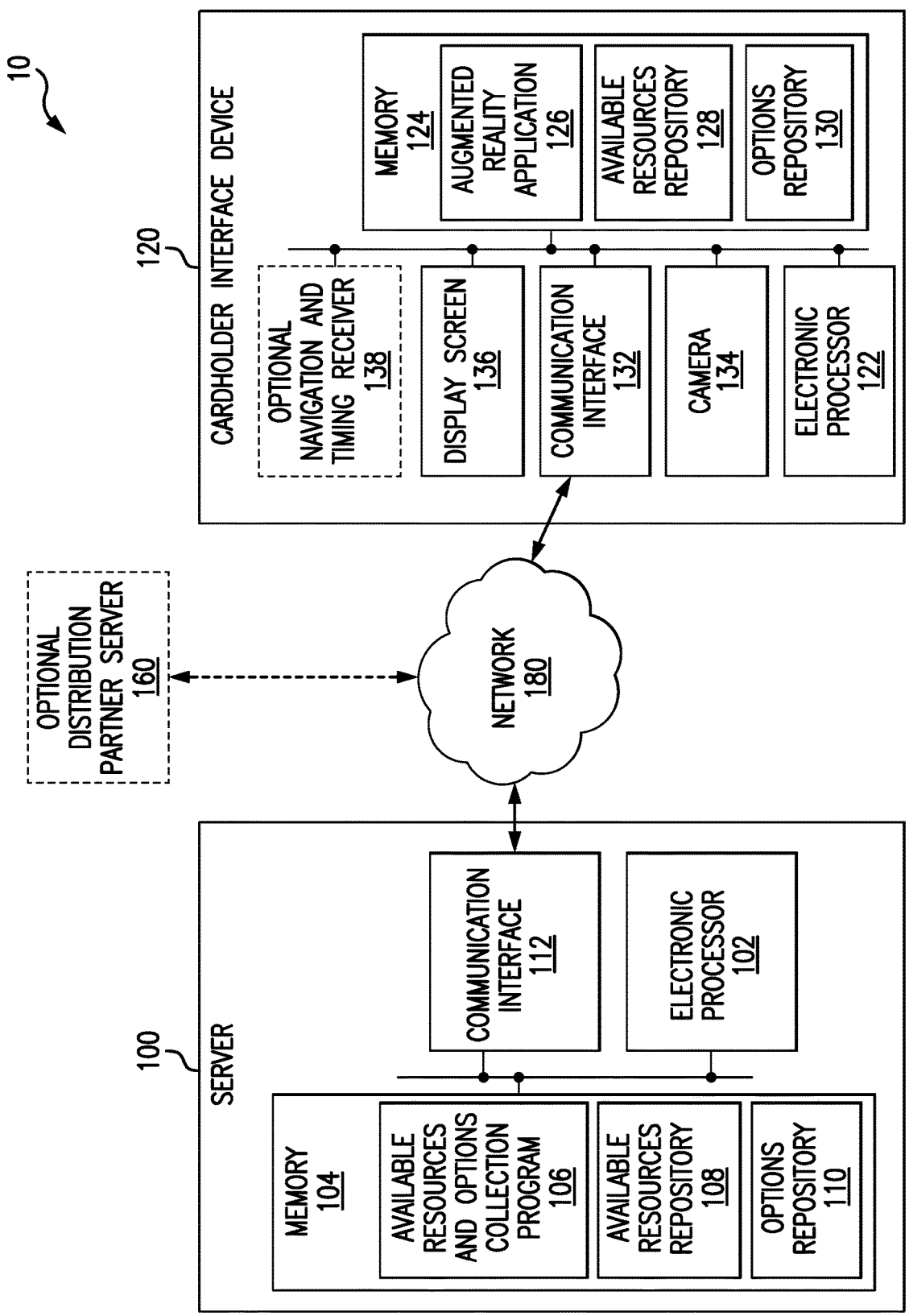
FIG. 1 is a block diagram illustrating a system with augmented reality of available resources and options.

FIG. 1 is a block diagram illustrating a system 10 with augmented reality of available resources and options. It should be understood that, in some embodiments, there are different configurations from the configuration illustrated in FIG. 1. The functionality described herein may be extended to any number of servers providing distributed processing.

In the example of FIG. 1, the system 10 includes a server 100, a cardholder interface device 120, an optional distribution partner server 160, and a network 180. The server 100 includes an electronic processor 102 (for example, a microprocessor or another suitable processing device), a memory 104 (for example, a non-transitory computer-readable medium or a non-transitory computer-readable storage medium), and a communication interface 112. It should be understood that, in some embodiments, the server 100 may include fewer or additional components in configurations different from that illustrated in FIG. 1. Also the server 100 may perform additional functionality than the functionality described herein. In addition, the functionality of the server 100 may be incorporated into other servers (for example, the functionality of the server 100 may be incorporated into the optional distribution partner server 160). As illustrated in FIG. 1, the electronic processor 102, the memory 104, and the communication interface 112 are electrically coupled by one or more control or data buses enabling communication between the components.

The electronic processor 102 executes machine-readable instructions stored in the memory 104. For example, the electronic processor 102 may execute instructions stored in the memory 104 to perform the functionality described herein.

The memory 104 may include a program storage area (for example, read only memory (ROM)) and a data storage area (for example, random access memory (RAM), and other non-transitory, machine-readable medium). In some examples, the program storage area may store machine-executable instructions regarding an available resources and options collection program 106 (hereinafter "card benefits and offers collection program 106"). In some examples, the data storage area may store data regarding an available resources repository 108 (hereinafter "card benefits repository 108) and an options repository 110 (hereinafter "offers repository 110").

The card benefits and offers collection program 106 causes the electronic processor 102 to collect or update the card benefits stored in the card benefits repository 108. In some examples, the card benefits and offers collection program 106 causes the electronic processor 102 to collect or update the card benefits based on inputs (e.g., administrative user inputs indicative of added benefits, eliminated benefits, and/or benefit changes) received from an administrative user. In other examples, the card benefits and offers collection program 106 causes the electronic processor 102 to collect or update the card benefits based on inputs (e.g., external user inputs indicative of added benefits, eliminated benefits, and/or benefit changes) received from an external user. For example, the electronic processor 102 may receive the aforementioned inputs from a verified cardholder via the cardholder interface device 120 and the network 180 and update the card benefits repository 108. In some examples, the card benefits and offers collection program 106 also causes the electronic processor 102 to automatically access the websites of various cards to determine whether any changes in benefits have occurred with the cards and update the card benefits stored in the card benefits repository 108 based on changes to the benefits.

Additionally or alternatively, the card benefits and offers collection program 106 causes the electronic processor 102 to collect or update offers stored in the offers repository 110. In some examples, the card benefits and offers collection program 106 causes the electronic processor 102 to collect or update the offers based on inputs (e.g., administrative user inputs indicative of added offers, eliminated offers, and/or offer changes) received from an administrative user. In other examples, the card benefits and offers collection program 106 causes the electronic processor 102 to collect or update the offers based on inputs (e.g., external user inputs indicative of added offers, eliminated offers, and/or offer changes) received from an external user. For example, the card benefits and offers collection program 106 may cause the electronic processor 102 to receive the aforementioned inputs from a verified cardholder via the cardholder interface device 120 and the network 180 and update the offers in the offers repository 110. In some examples, the card benefits and offers collection program 106 also causes the electronic processor 102 to automatically access the websites of various cards to determine whether any changes in offers have occurred and update the offers stored in the offers repository 110 based on changes to the offers.

In examples, the card benefits repository 108 is a central repository including card benefits, card images, and card names from a plurality of cards (e.g., credit cards, debit cards, prepaid cards, membership cards, and other suitable cards.). Each of the card benefits is associated with a specific card image and/or a specific card name. The card benefits are updated periodically with the card benefits and offers collection program 106 as described above.

The offer repository 110 includes digital personalized offers from various merchants. In some examples, each of the digital personalized offers is associated with specific location coordinates. In other examples, like the card benefits discussed above, each of the offers may also be associated with a specific card image and/or a specific card name. The digital personalized offers are updated periodically with the card benefits and offers collection program 106 as described above.

The communication interface 112 receives data from and provides data to devices external to the server 100, such as the cardholder interface device 120 and the optional distribution partner server 160 via the network 180. For example, the communication interface 112 may include a port or connection for receiving a wired connection (for example, an Ethernet cable, fiber optic cable, a telephone cable, or the like), a wireless transceiver, or a combination thereof. In some examples, the communication interface includes an radio frequency identifier (RFID) reader. In some examples, the network 180 is the Internet.

In the example of FIG. 1, the cardholder interface device 120 (also referred to herein as "an electronic device" or "a display device") includes an electronic processor 122 (for example, a microprocessor or another suitable processing device), a memory 124 (for example, a non-transitory computer-readable storage medium), a communication interface 132, a camera 134, a display screen 136, and an optional navigation and timing receiver 138. It should be understood that, in some embodiments, the cardholder interface device 120 may include fewer or additional components in configurations different from that illustrated in FIG. 1. Also the cardholder interface device 120 may perform additional functionality than the functionality described herein. In addition, some of the functionality of the cardholder interface device 120 may be incorporated into other servers (e.g., incorporated into the server 100). As illustrated in FIG. 1, the electronic processor 122, the memory 124, the communication interface 132, the camera 134, the display screen 136, and the optional navigation and timing receiver 138 are electrically coupled by one or more control or data buses enabling communication between the components.

The electronic processor 122 executes machine-readable instructions stored in the memory 124. For example, the electronic processor 122 may execute instructions stored in the memory 124 to perform the functionality described herein.

The memory 124 may include a program storage area (for example, read only memory (ROM)) and a data storage area (for example, random access memory (RAM), and other non-transitory, machine-readable medium). The program storage area includes an augmented reality application 126. In some examples, the augmented reality application 126 may be a standalone application. In other examples, the augmented reality application 126 is a feature that is part of a separate application (e.g., the augmented reality application 126 may be included as part of a camera application, a banking application, or other suitable application). When the augmented reality application 126 is part of a banking application, the banking application may already have predetermined card recognition that eliminates the "card recognition" as described in greater detail below. The data storage area includes an available resources repository 128 (hereinafter "card benefits repository 128") and an options repository 130 (hereinafter "offers repository 130").

The augmented reality application 126 causes the electronic processor 122 to update the card benefits stored in the card benefits repository 128 or the card benefits repository 108. In some examples, the augmented reality application 126 causes the electronic processor 122 to update the card benefits based on inputs (e.g., added benefits, eliminated benefits, benefit changes, and/or a recognized card from "card recognition") from a cardholder. In other examples, the augmented reality application 126 causes the electronic processor 122 to periodically request card benefits from the server 100 to determine whether any changes in benefits have occurred with the cards and update the card benefits stored in the card benefits repository 128 based on changes to the benefits stored in the card benefits repository 108. In yet other examples, the augmented reality application 126 causes the electronic processor 122 to periodically request card benefits from the optional distribution partner server 160 to determine whether any changes in benefits have occurred with the cards and update the card benefits stored in the card benefits repository 128 based on changes to the benefits. In the above examples, the card benefits repository 128 may include some or all of the card benefits stored in the card benefits repository 108.

Additionally or alternatively, the augmented reality application 126 causes the electronic processor 122 to update the offers stored in the offers repository 130 or the offers repository 110. In some examples, the augmented reality application 126 causes the electronic processor 122 to update the offers based on inputs (e.g., added benefits, eliminated benefits, benefit changes, and/or a recognized card from "card recognition") from a cardholder. In other examples, the augmented reality application 126 causes the electronic processor 122 to periodically request offers from the server 100 to determine whether any changes in offers have occurred and update the offers stored in the offers repository 130 based on changes to the offers stored in the offers repository 110. In yet other examples, the augmented reality application 126 causes the electronic processor 122 to periodically request offers from the optional distribution partner server 160 to determine whether any changes in offers have occurred and update the offers stored in the offers repository 130 based on changes to the offers. In the above examples, the offers repository 130 may include some or all of the offers stored in the offers repository 110.

The augmented reality application 126 causes the electronic processor 122 to generate one or more graphical user interfaces (illustrated in FIG. 2 below). The augmented reality application 126 also causes the electronic processor 122 to control the display screen 136 to display the one or more graphical user interfaces overlaid on the image data that is generated by the camera 134. The one or more graphical user interfaces include graphical elements that are based on card benefits and/or offers stored in the card benefits repository 128 and the offers repository 130, respectively. The one or more graphical user interfaces of the augmented reality application 126 allow a cardholder to view some or all of the cardholder's card benefits and/or offers associated with the cardholder's cards on the cardholder interface device 120.

In a first non-limiting example, the augmented reality application 126 causes the electronic processor 122 to perform recognition of a cardholder's card. The "card recognition" of the example above may include image recognition of 1) a logo on the card (e.g., a bank logo, a merchant logo, or a payment processor logo), 2) the color and shading of the card, 3) the background image of the card, 4) the card number on the card, or some combination thereof. Additionally or alternatively, the "card recognition" of the example above may include electronic recognition with an electronic identification means (e.g., a radio frequency identification tag that is identified by a radio frequency identification reader in the cardholder interface device).

For example, when executing the augmented reality application 126, the electronic processor 122 performs image recognition of a credit card background image, which is the subject being imaged by the camera 134. The electronic processor 122 queries the electronic processor 102 of the server 100 to match the background image of the credit card to a specific credit card background image stored in the card benefits repository 108. The electronic processor 102 outputs the card benefits of the "matched" credit card to the electronic processor 122. The electronic processor 122 generates the one or more graphical user interfaces as described above based at least in part on the card benefits of the "matched" credit card.

In a second non-limiting example, the augmented reality application 126 causes the electronic processor 122 to perform name recognition of a cardholder's card. For example, when executing the augmented reality application 126, the electronic processor 122 performs name recognition of a credit card based on inputs received by the electronic processor 122 from the cardholder. For example, the cardholder may enter "XYZ" as input for the name of a credit card and the electronic processor 122 queries the electronic processor 102 of the server 100 to match the name of the "XYZ" credit card to the "XYZ" credit card name stored in the card benefits repository 108. The electronic processor 102 outputs the card benefits of the matched "XYZ" credit card to the electronic processor 122. The electronic processor 122 generates the one or more graphical user interfaces as described above based at least in part on the card benefits of the matched "XYZ" credit card.

In a third non-limiting example, the augmented reality application 126 causes the electronic processor 122 to perform location recognition of the cardholder interface device 120. For example, when executing the augmented reality application 126, the electronic processor 122 performs location recognition of the cardholder based on the location coordinates received by the electronic processor 122 from the optional navigation and timing receiver 138. In some examples, the electronic processor 122 may also perform location recognition of the cardholder based on the location coordinates derived from the access point of the communication interface 132 (e.g., the location coordinates associated with the wireless router that is part of the network 150). The electronic processor 122 queries the electronic processor 102 of the server 100 to match the location coordinates to one or more offers stored in the offers repository 110. The electronic processor 102 outputs the "matched" offers to the electronic processor 122. The electronic processor 122 generates the one or more graphical user interfaces as described above based at least in part on the "matched" offers.

In a fourth non-limiting example, the augmented reality application 126 causes the electronic processor 122 to perform name recognition of a cardholder's card. For example, when executing the augmented reality application 126, the electronic processor 122 performs name recognition of a credit card based on inputs received by the electronic processor 122 from the cardholder. For example, the cardholder may enter "XYZ" as input for the name of a credit card and the electronic processor 122 queries the electronic processor 102 of the server 100 to match the name of the "XYZ" credit card to the "XYZ" credit card name stored in the offers repository 110. The electronic processor 102 outputs the offers of the matched "XYZ" credit card to the electronic processor 122. The electronic processor 122 generates the one or more graphical user interfaces as described above based at least in part on the offers of the matched "XYZ" credit card.

In some examples, the cardholder interface device 120 is a smartphone and the display screen 136 is a presence-sensitive display screen. In these examples, the cardholder may select one of the graphical elements corresponding to one of the card benefits or one of the offers. Upon selecting the graphical element, the cardholder is able to "drill down" into specific information regarding the selected card benefit or specific information regarding the selected offer.

In some examples, the cardholder interface device 120 includes one or more user interfaces (not shown). The one or more user interfaces include one or more input mechanisms (for example, a touch screen, a keypad, a button, a knob, and the like), one or more output mechanisms (for example, a display, a printer, a speaker, and the like), or a combination thereof. The one or more optional user interfaces receive input from a user (e.g., a cardholder), provide output to a user, or a combination thereof. In some embodiments, as an alternative to or in addition to managing inputs and outputs through the one or more optional user interfaces, the cardholder interface device 120 may receive user input, provide user output, or both by communicating with an external device (e.g., the server 100) over a wired or wireless connection.

The communication interface 132 receives data from and provides data to devices external to the cardholder interface device 120, i.e., the server 100 and the optional distribution partner server 160. For example, the communication interface 132 may include a port or connection for receiving a wired connection (for example, an Ethernet cable, fiber optic cable, a telephone cable, or the like), a wireless transceiver, or a combination thereof. In some examples, the communication interface 132 may be communicatively connected to the communication interface 112 via a backhaul (not shown).

The camera 134 includes an image sensor that generates and outputs image data of a subject. In some examples, the camera 134 includes a semiconductor charge-coupled device (CCD) image sensor, a complementary metal-oxide-semiconductor (CMOS) image sensor, or other suitable image sensor. The electronic processor 122 receives the image data of the subject that is output by the camera 134.

The display screen 136 is an array of pixels that generates and outputs images including augmented reality images to a user. The augmented reality images are images including a camera image and a graphical user interface overlaid on the camera image. In some examples, the display screen 136 is one of a liquid crystal display (LCD) screen, a light-emitting diode (LED) and liquid crystal display (LCD) screen, a quantum dot light-emitting diode (QLED) display screen, an interferometric modulator display (IMOD) screen, a micro light-emitting diode display screen (mLED), a virtual retinal display screen, or other suitable display screen. The electronic processor 122 controls the display screen 136 to display the augmented reality images when executing the augmented reality application 126.

The optional navigation and timing receiver 138 is a radio frequency (RF) receiver that receives navigation and timing signals from positioning satellites and outputs location coordinates to the electronic processor 122. In some examples, the optional navigation and timing receiver 138 is one of a global positioning system (GPS) receiver, a global navigation satellite system (GNSS) receiver, or other suitable satellite navigation receiver. The electronic processor 122 receives the location coordinates from the optional navigation and timing receiver 138.

Figure 2:
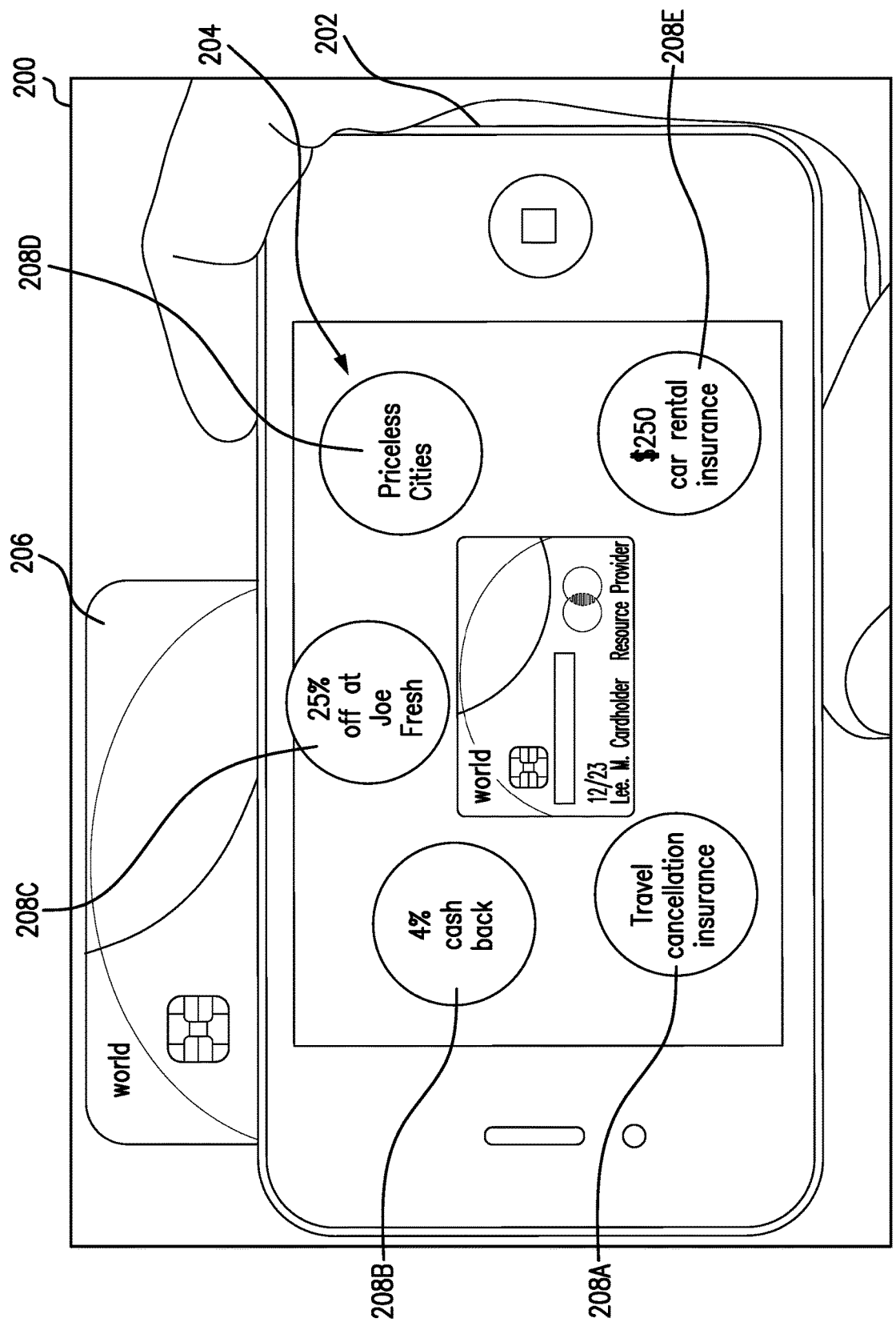
FIG. 2 is an image illustrating a cardholder interface device of FIG. 1 with an example augmented reality image based on a credit card.

FIG. 2 is an image 200 illustrating a cardholder interface device 120 of FIG. 1 with an example augmented reality image 204 based on a credit card 206. In the example of FIG. 2, the cardholder interface device 120 is a smartphone. The augmented reality image 204 includes graphical user interface elements 208A-208E overlaid on a camera image 210 displayed on the display screen 136 and based on an image or name recognition of the credit card 206.

As described above, in some examples, the augmented reality application 126 of the cardholder interface device 120 causes the electronic processor 122 to perform image or name recognition of a cardholder's card. The electronic processor 122 queries the electronic processor 102 of the server 100 to match the image or the name of the credit card to a specific credit card image stored in the card benefits repository 108. The electronic processor 102 outputs the card benefits of the "matched" credit card to the electronic processor 122. In other examples, the electronic processor 122 queries the card benefits repository 128 to match the image or the name of the credit card to a specific credit card image stored in the card benefits repository 128. The electronic processor 122 generates the graphical user interface elements 208A, 208D, and 208E based on the card benefits of the "matched" credit card.

Additionally or alternatively, in some examples, the augmented reality application 126 of the cardholder interface device 120 causes the electronic processor 122 to perform location recognition of the cardholder interface device 120. For example, when executing the augmented reality application 126, the electronic processor 122 performs location recognition of the cardholder based on the location coordinates received by the electronic processor 122 from the optional navigation and timing receiver 138. The electronic processor 122 queries the electronic processor 102 of the server 100 to match the location coordinates to one or more offers stored in the offers repository 110. The electronic processor 102 outputs the "matched" offers to the electronic processor 122. In other examples, the electronic processor 122 queries the offers repository 130 to match the location coordinates to one or more offers stored in the offers repository 130. The electronic processor 122 generates the graphical user interface elements 208B and 208C based on the "matched" offers.

A cardholder may select (e.g., a presence-sensitive input on the display screen 136) any one of the graphical user interface elements 208A, 208D, and 208E overlaid on the camera image 210 of the credit card 206 to find out more detailed information of the credit card 206. A cardholder may also select any one of the graphical user interface elements 208B and 208C overlaid on the camera image 210 of the credit card 206 to find out more detailed information of local digital personalized offers associated with the credit card 206, or in other examples, local digital personalized offers across some or all of the cardholder's cards.

Additionally, upon selecting any of the graphical user interface elements 208A-208E, a cardholder may select another graphical user interface element (not shown) to cause the cardholder interface device 120 to perform an operation. In some examples, the operation is to launch a website through an internet browser application on the cardholder interface device 120. In other examples, the operation is to make a phone call. In other examples, the operation is to link to other applications on the cardholder interface device 120 (e.g., a maps application). In yet other examples, the operation is to execute a transaction by launching a digital wallet or by pulling up information of a payment card on file.

Figure 3:
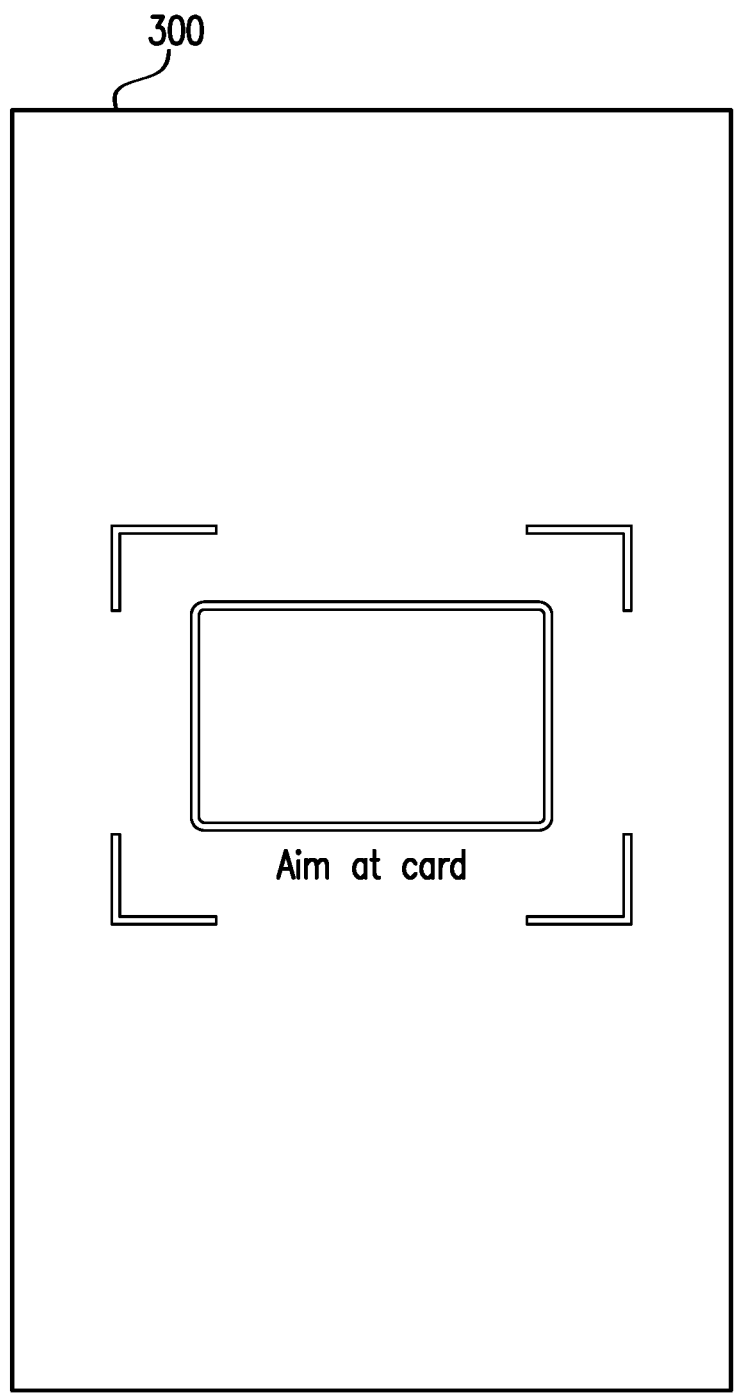
FIG. 3 is an image illustrating an example augmented reality image without a card present.

FIG. 3 is an image illustrating an example augmented reality image 300 without a card present.

Figure 4:
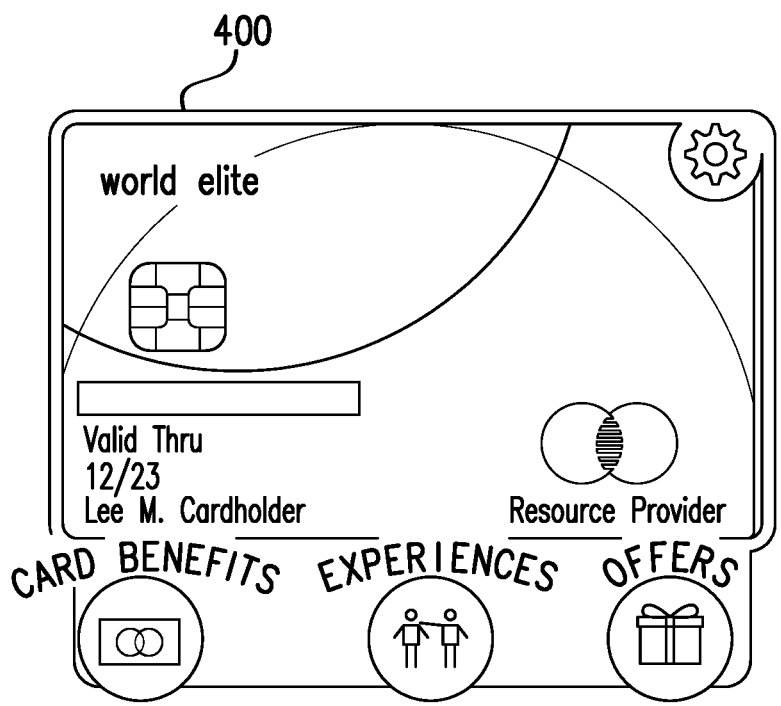
FIG. 4 is an image illustrating a second example augmented reality image based on a credit card, the second augmented reality image including card benefits, experiences, and offers.

FIG. 4 is an image illustrating a second example augmented reality image 400 based on a credit card, the second augmented reality image including card benefits, experiences, and offers.

Figure 5:
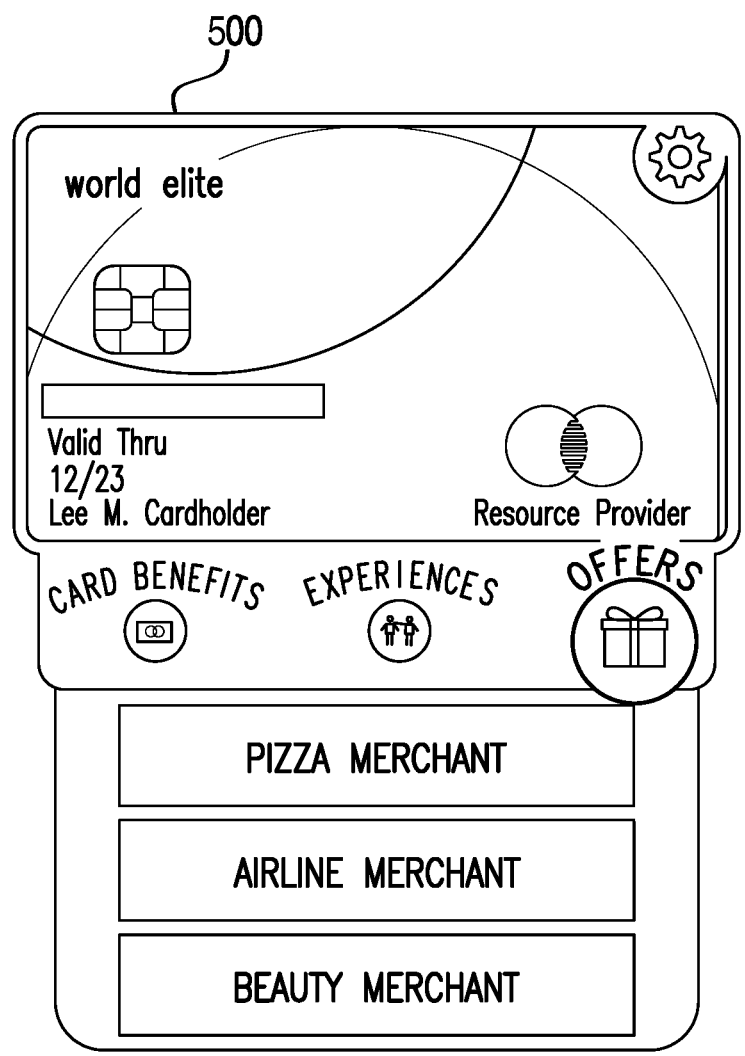
FIG. 5 is an image illustrating a third example augmented reality image based on a credit card, the third augmented reality image including a highlighted offers selection with a pizza merchant graphical user interface element, an airline merchant graphical user interface element, and a beauty merchant graphical user interface element.

FIG. 5 is an image illustrating a third example augmented reality image 500 based on a credit card, the third augmented reality image including a highlighted offers selection with a pizza merchant graphical user interface element, an airline merchant graphical user interface element, and a beauty merchant graphical user interface element.

Figure 6:
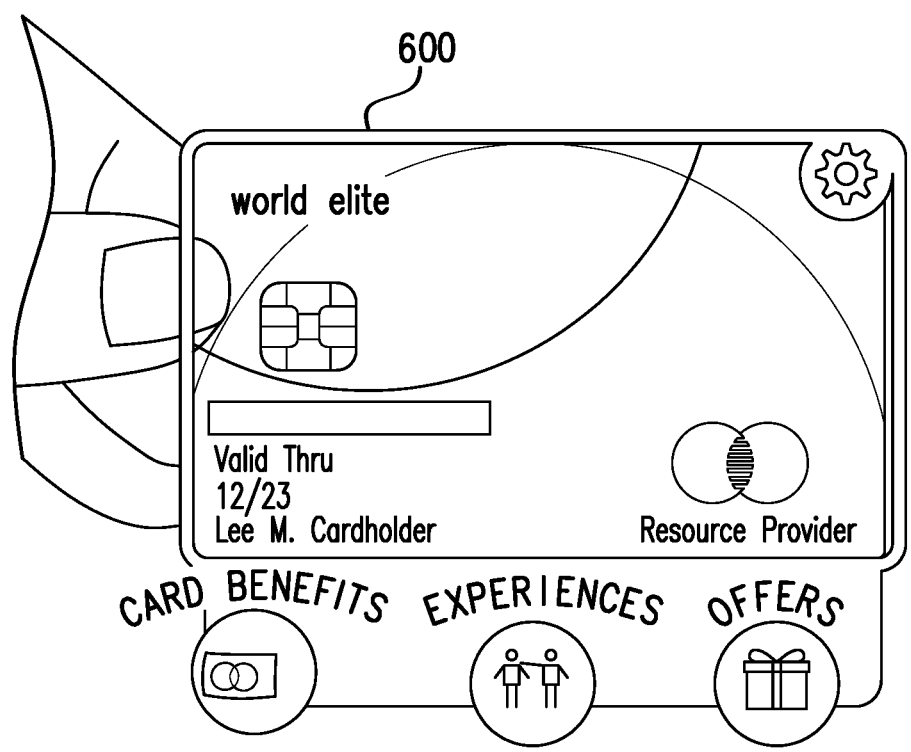
FIG. 6 is an image illustrating a fourth example three-dimensional augmented reality image based on a credit card.

FIG. 6 is an image illustrating a fourth example three-dimensional augmented reality image 600 based on a credit card.

Figure 7:
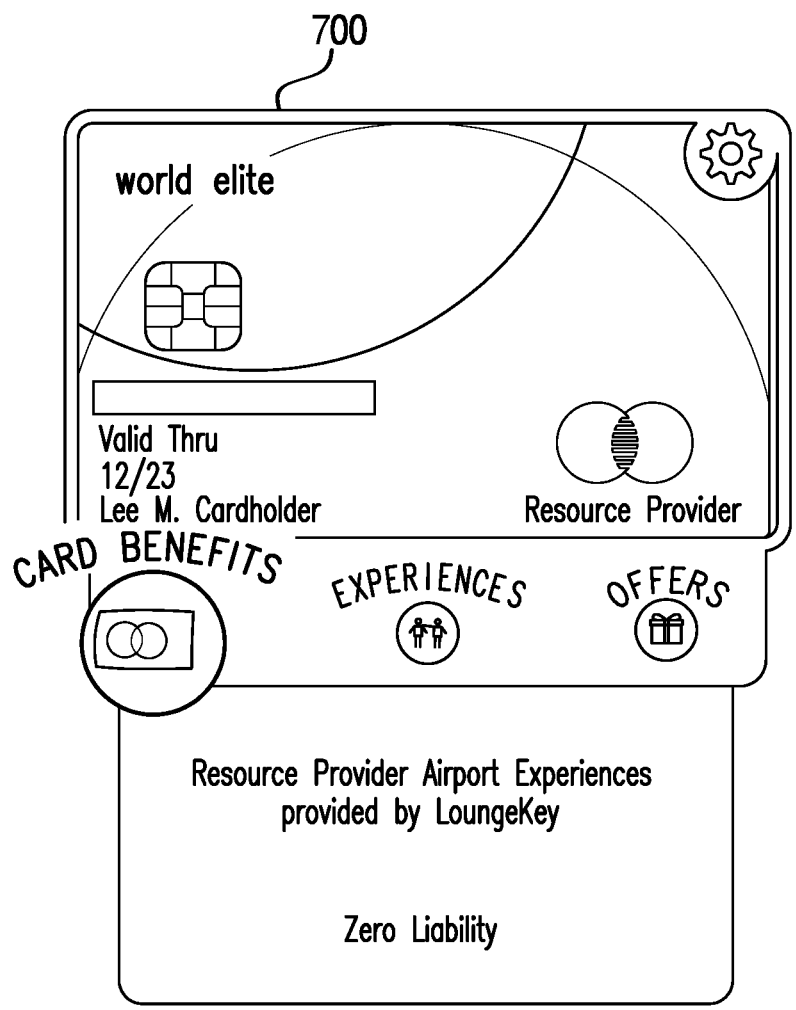
FIG. 7 is an image illustrating a fifth example augmented reality image based on a credit card, the fifth augmented reality image including a highlighted card benefits selection with lounge experience graphical user interface element and zero liability graphical user interface element.

FIG. 7 is an image illustrating a fifth example augmented reality image 700 based on a credit card, the fifth augmented reality image including a highlighted card benefits selection with lounge experience graphical user interface element and zero liability graphical user interface element.

Figure 8:
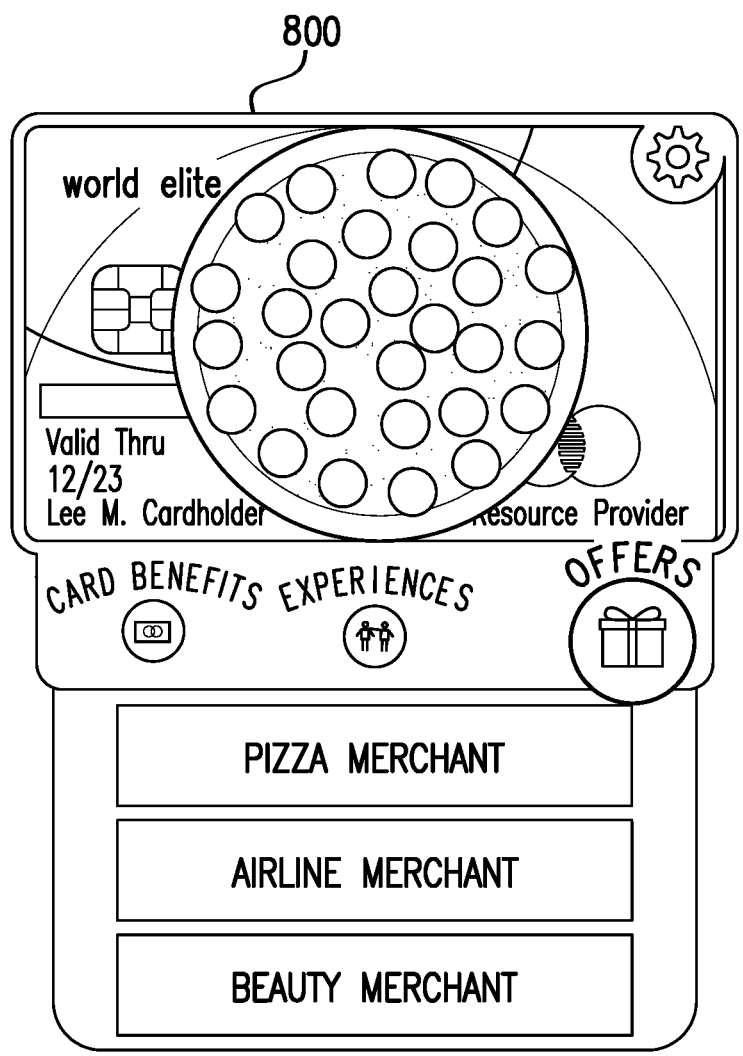
FIG. 8 is an image illustrating a sixth example augmented reality image based on a credit card, the sixth augmented reality image including a highlighted offers selection with a pizza merchant graphical user interface element, an airline merchant graphical user interface element, a beauty merchant graphical user interface element, and a pizza graphical user interface element.

FIG. 8 is an image illustrating a sixth example augmented reality image 800 based on a credit card, the sixth augmented reality image including a highlighted offers selection with a pizza merchant graphical user interface element, an airline merchant graphical user interface element, a beauty merchant graphical user interface element, and a pizza graphical user interface element.

Figure 9:
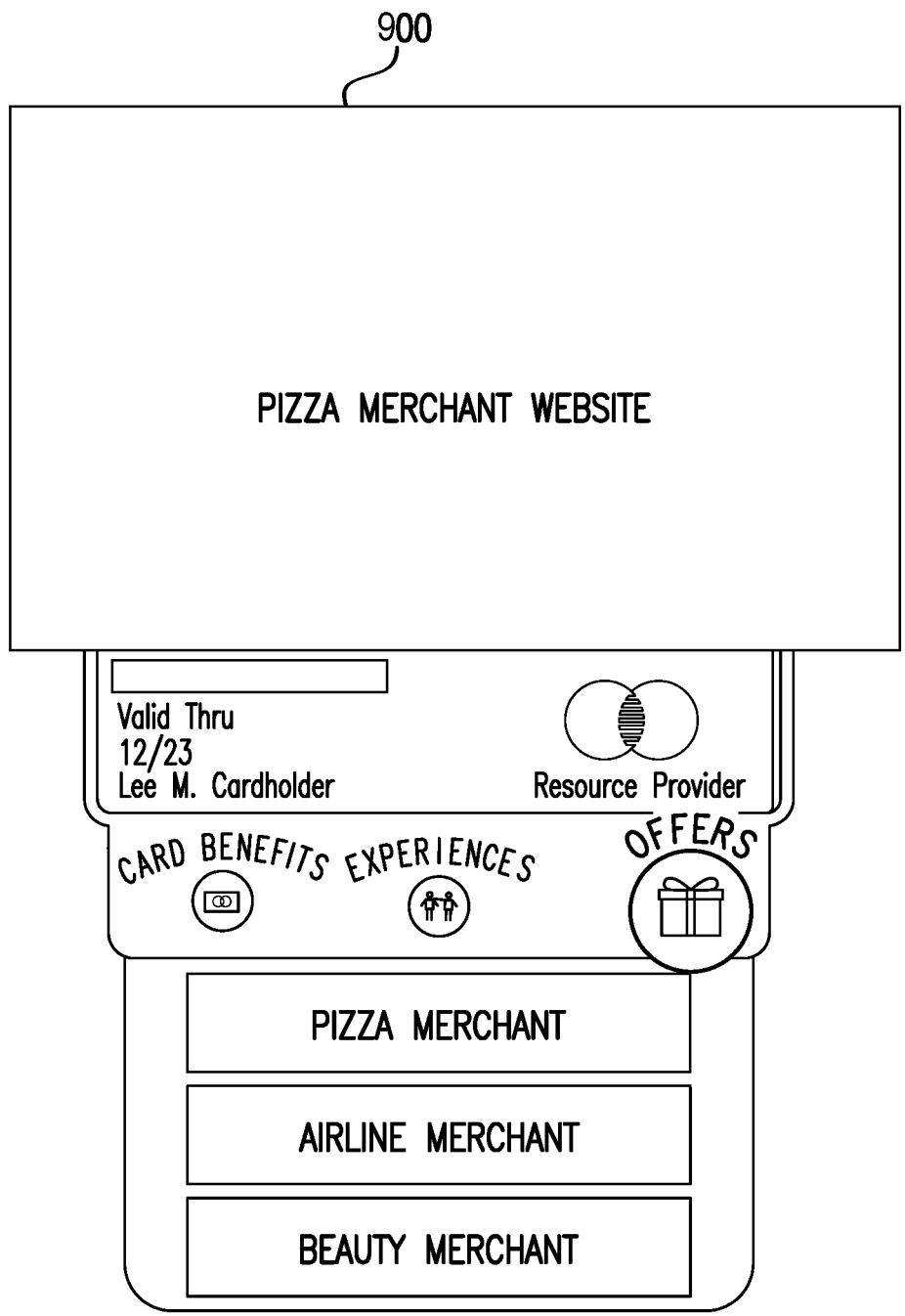
FIG. 9 is an image illustrating a seventh example augmented reality image based on a credit card, the seventh augmented reality image including a highlighted offers selection with a pizza merchant graphical user interface element, an airline merchant graphical user interface element, a beauty merchant graphical user interface element, and a pizza merchant website graphical user interface element.

FIG. 9 is an image illustrating a seventh example augmented reality image 900 based on a credit card, the seventh augmented reality image including a highlighted offers selection with a pizza merchant graphical user interface element, an airline merchant graphical user interface element, a beauty merchant graphical user interface element, and a pizza merchant website graphical user interface element.

FIGS. 10-13 are images illustrating an example progression of augmented reality images 1002-1308 on a display device with a graphical user interface that leads to different portals that explain benefits and offers associated with the credit card. In some examples, the display device may be a smartphone, a tablet, or other suitable display device. For example, the display device may be the cardholder interface device 120 as described above with respect to FIG. 1.

Figure 10:
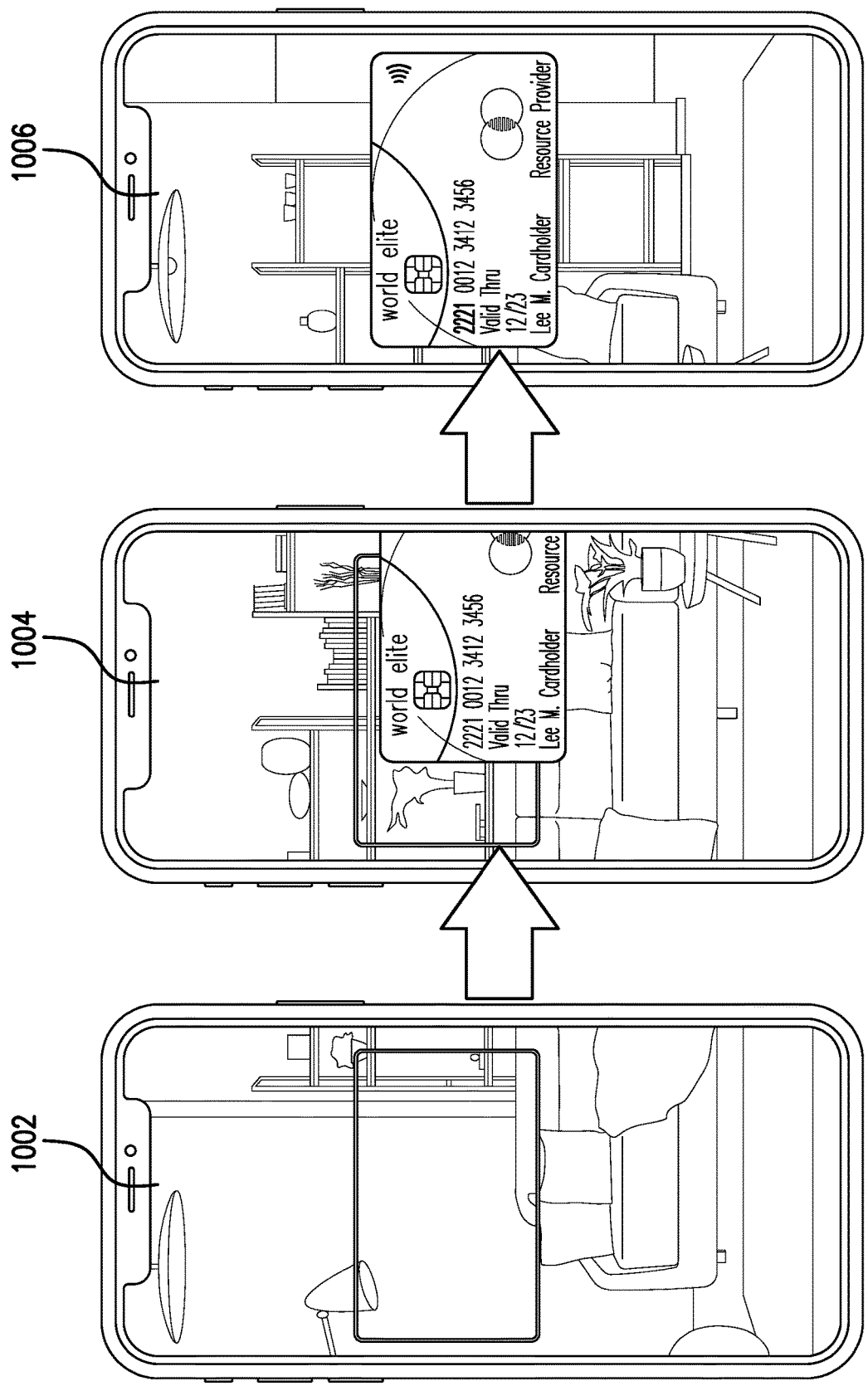
FIGS. 10-13 are images illustrating a first example progression of augmented reality images that leads to different portals of a graphical user interface that explain the benefits and offers associated with the credit card.

In the example of FIG. 10, the display device displays an augmented reality image 1002 that does not include a credit card and is similar to FIG. 3. The display device also displays an augmented reality image 1004 that includes a portion of a credit card as the credit is being brought into alignment with the camera. The display device also displays an augmented reality image 1006 that includes a credit card in its entirety and is fully aligned with the camera, which is similar to FIG. 4 in that the credit card is recognized as described above.

Figure 11:
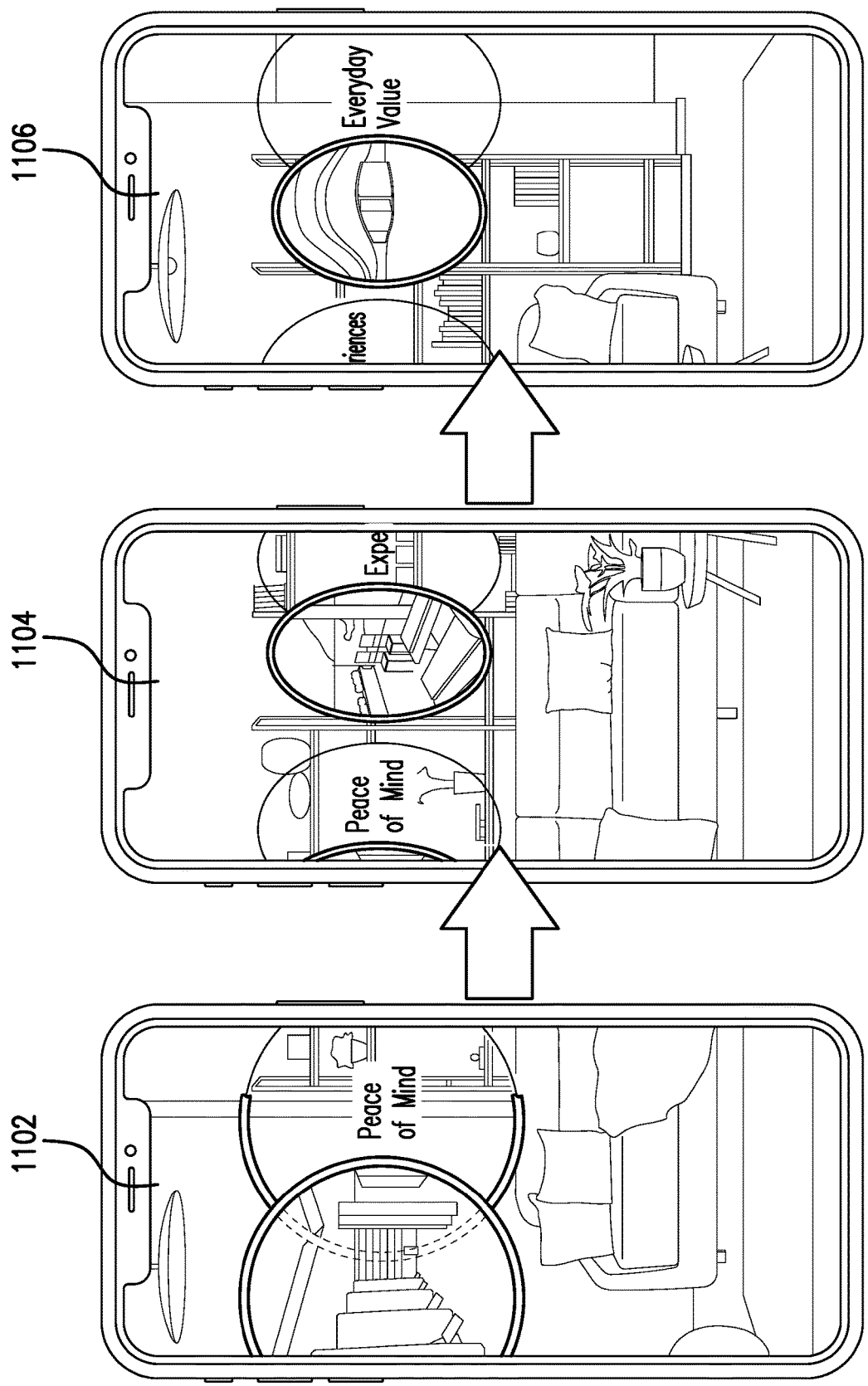

In the example of FIG. 11, the display device displays an augmented reality image 1102 that includes a portal-type graphical user interface element. Specifically, in some examples, the augmented reality image 1102 includes a portal-type graphical user interface element that may be entitled "Peace of Mind." In these examples, the "Peace of Mind" portal-type graphical user interface element includes more detailed information about the credit card that is recognized. For example, the more detailed information may include information regarding an enhanced identity theft resolution benefit, a cellphone protection benefit, a zero liability benefit and a global emergency services benefit that are associated with the credit card that is recognized.

In the example of FIG. 11, the display device displays an augmented reality image 1104 that includes a second portal-type graphical user interface element. Specifically, in some examples, the augmented reality image 1104 includes a second portal-type graphical user interface element that may be entitled "Experiences." In these examples, the "Experiences" portal-type graphical user interface element includes more detailed information about the credit card that is recognized. For example, the more detailed information may include information regarding travel and lifestyle services and benefits that are associated with the credit card that is recognized.

In the example of FIG. 11, the display device also displays an augmented reality image 1106 that includes a third portal-type graphical user interface element. Specifically, in some examples, the augmented reality image 1104 includes a third portal-type graphical user interface element that may be entitled "Everyday Value." In some examples, the "Everyday Value" portal-type graphical user interface element includes local digital personalized offers that are associated with the credit card that are recognized. For example, the local digital personalized offers are offers to various third-party merchants that are associated with the credit card that is recognized.

Figure 12:
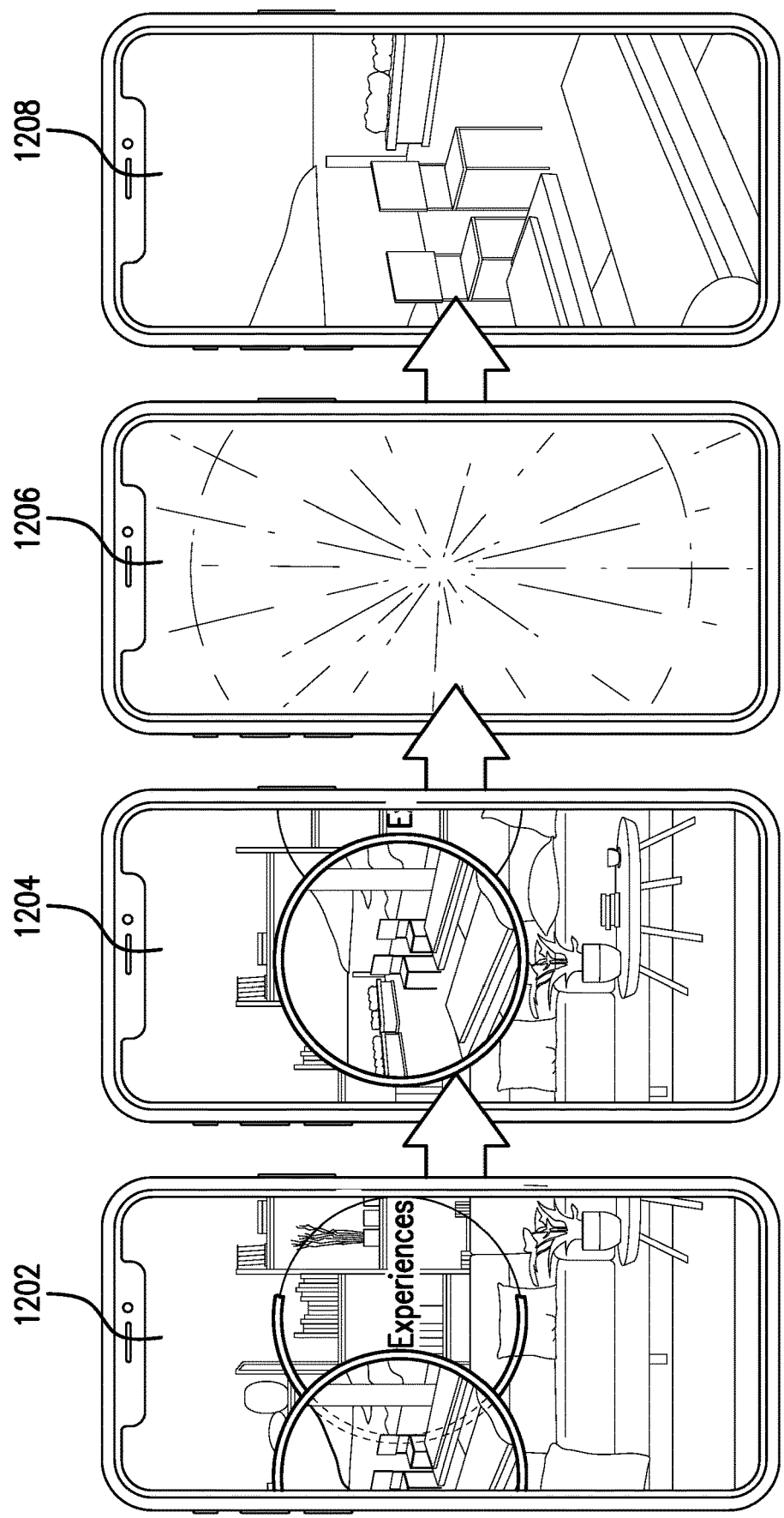

In the example of FIG. 12, the display device is displaying an augmented reality image 1202 that includes the third portal-type graphical user interface element of FIG. 11 with a keyline progress bar. For example, the keyline progress bar may be around the outer edge of the right portal entitled "Experiences." In some examples, when the third portal-type graphical user interface element is on the display screen of the display device for a predetermined period of time (e.g., three seconds), the display device transitions to an augmented reality image 1204 that predominantly displays a fourth portal-type graphical user interface element including an image of an environment.

After transitioning to the augmented reality image 1204, the display device also transitions to pre-stored three-hundred and sixty degree image 1208 of the environment. For example, the display device implements a blur transition 1206 to the pre-stored three-hundred and sixty degree image 1208 (e.g., a motion image with subtle motions, such as ocean waves) of the environment to make it seem like the fourth portal-type graphical user element transported a user of the display device to the environment. In some examples, the environment may be a beach resort environment or other suitable environment. Additionally, in some examples, every portal environment is themed in a manner that is relevant to the benefits and offers associated with the credit card that is recognized. Furthermore, every portal environment includes one or more items of interest that are discoverable and contain information regarding the various benefits and offers after interaction or focusing on one of the items of interest.

Figure 13:
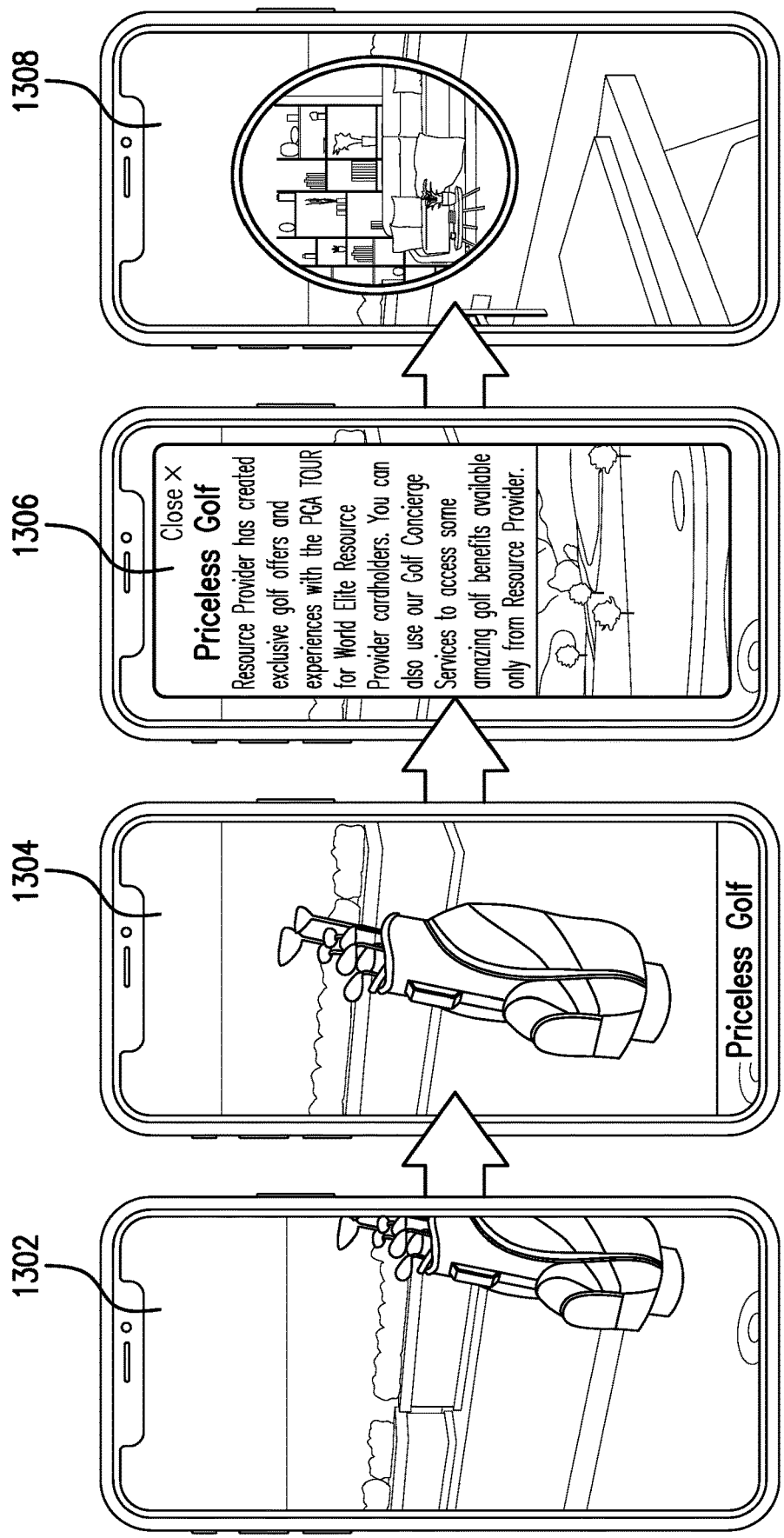

In the example of FIG. 13, the display device displays a portion 1302 of the pre-stored three-hundred and sixty degree image 1208. The portion 1302 includes an item of interest (e.g., a golf bag). In the example of FIG. 13, the display device also displays a portion 1304 of the pre-stored three-hundred and sixty degree image 1208 that includes a glowing item of interest. The glowing item of interest is selectable graphical user interface element that delivers topline information (and a subtitle appears when the sound of the display device is off) regarding a particular benefit.

In the example of FIG. 13, the display device displays pop-up box 1306 with benefit details after focusing on the item of interest. Additionally, in the example of FIG. 13, the display device displays an augmented reality image 1308 that includes an exit portal within the pre-stored three-hundred and sixty degree image 1208 that exits the pre-stored three-hundred and sixty degree image 1208.

Figure 14:
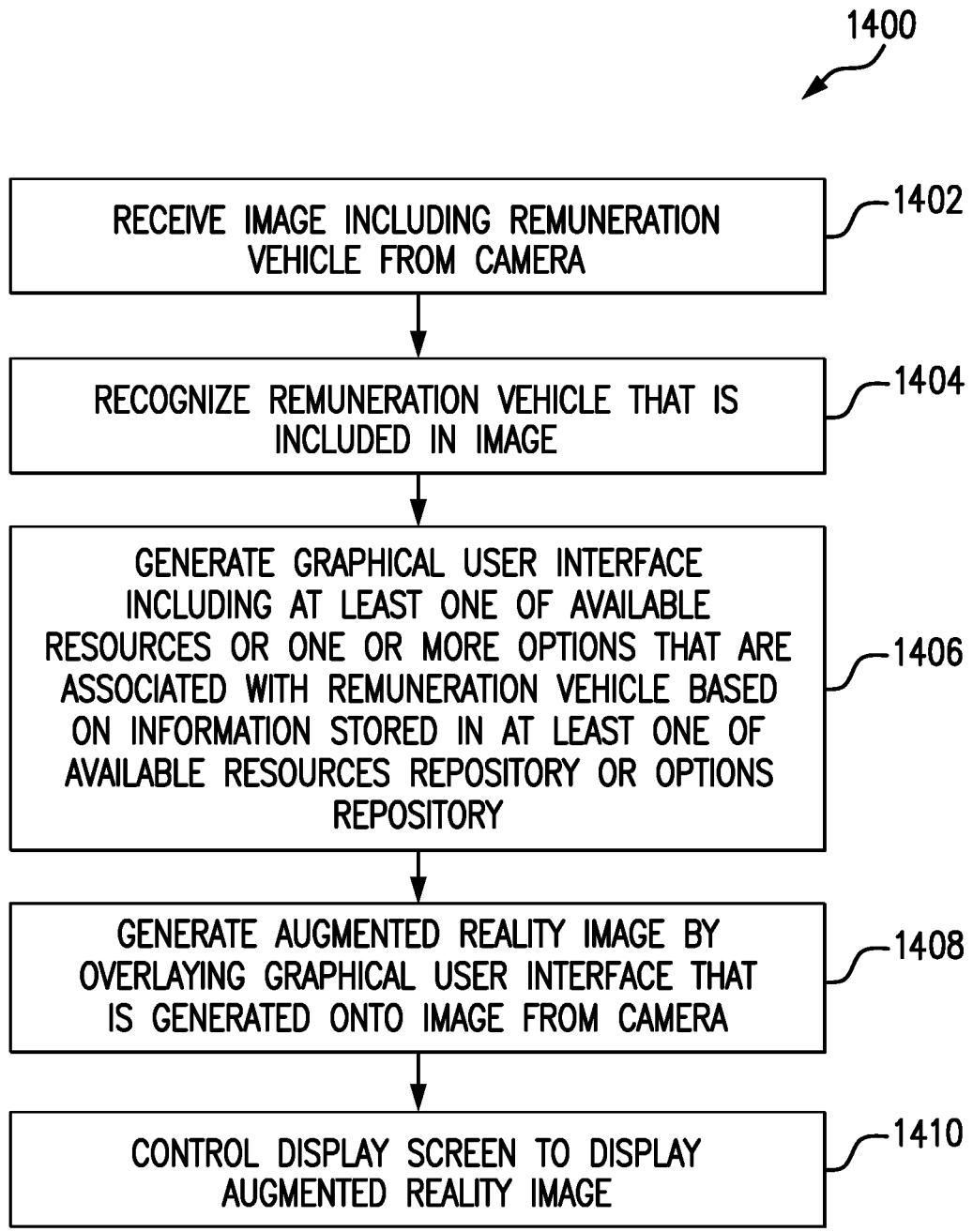
FIG. 14 is a flowchart illustrating an example method performed by the system of FIG. 1.

FIG. 14 is a flowchart illustrating an example method 1400 performed by the system 10 of FIG. 1. In the example of FIG. 14, the method 1400 includes the electronic processor 122 receiving an image including a remuneration vehicle from the camera 134 (at block 1402).

The method 1400 includes the electronic processor 122 recognizing the remuneration vehicle that is included in the image (at block 1404). In some examples, to recognize the remuneration vehicle that is included in the image, the electronic processor 122 may perform image recognition of a logo on the remuneration vehicle in the image. In other examples, to recognize the remuneration vehicle that is included in the image, the electronic processor 122 may perform image recognition of a color and a shading of the remuneration vehicle in the image. In yet other examples, to recognize the remuneration vehicle that is included in the image, the electronic processor 122 may perform image recognition of a background image of the remuneration vehicle in the image. In some examples, to recognize the remuneration vehicle that is included in the image, the electronic processor 122 may perform image recognition of a unique number associated with the remuneration vehicle in the image. In other examples, to recognize the remuneration vehicle that is included in the image, the electronic processor 122 may control the communication interface 132 to perform electronic recognition of a radio frequency identifier (RFID) tag associated with the remuneration vehicle in the image.

The method 1400 includes the electronic processor 102 generating a graphical user interface including at least one of available resources or one or more options that are associated with remuneration vehicle based on information stored in the at least one of the available resources repository or the options repository (at block 1406). The method 1400 includes the electronic processor 102 generating an augmented reality image by overlaying the graphical user interface that is generated onto the image from the camera (at block 1408). The method 1400 also includes the electronic processor 102 controlling the display screen 136 to display the augmented reality image (at block 1410).

Additionally, in some examples, the method 1400 may further include the electronic processor 122 periodically controlling a communication interface to request an update of available resources associated with the remuneration vehicle from the server 100 via the network 180, the electronic processor 122 receiving the update of the available resources associated with the remuneration vehicle from the server 100, the electronic processor 122 comparing the update to any existing available resources that are stored in the available resources repository to determine changes in the available resources that are associated with the remuneration vehicle, and the electronic processor 122 controlling the memory to store the changes in the available resources repository. In these examples, the electronic processor 122 may also output a notification to the display screen that is indicative of the changes in the available resources associated with the remuneration vehicle.

Additionally or alternatively, in some examples, the method 1400 may further include the electronic processor 122 periodically controlling a communication interface to request an update of digital personalized offers associated with the remuneration vehicle from a server via a network, the electronic processor 122 receiving the update of digital personalized offers associated with the remuneration vehicle from the server, the electronic processor 122 comparing the update to any existing digital personalized offers that are stored in the options repository to determine changes in the digital personalized offers that are associated with the remuneration vehicle, and the electronic processor 122 controlling the memory to store the changes in the options repository. In these examples, the electronic processor 122 may also output a notification to the display screen that is indicative of the changes in the digital personalized offers that are associated with the remuneration vehicle.

Thus, the present disclosure provides, among other things, augmented reality of available resources and options. Various features and advantages of the invention are set forth in the following claim.

What is claimed is:

1. An electronic device comprising:
   a camera;
   a display screen;
   a memory including at least one of an available resources repository or an options repository; and
   an electronic processor communicatively connected to the memory, the camera, and the display, the electronic processor configured to
   determine a location of the electronic device,
   receive an image including a remuneration vehicle from the camera,
   recognize the remuneration vehicle that is included in the image,
   generate a graphical user interface including available resources and one or more options that are associated with the remuneration vehicle based on information stored in the at least one of the available resources repository or the options repository,
   generate an augmented reality image by overlaying the graphical user interface that is generated onto the image from the camera, and
   control the display screen to display the augmented reality image,
   wherein the available resources include benefits that are associated with the remuneration vehicle, and
   wherein the one or more options include digital personalized offers that are associated with the remuneration vehicle and are matched to the location of the electronic device.

2. The electronic device of claim 1, wherein, to recognize the remuneration vehicle that is included in the image, the electronic processor is further configured to perform image recognition of a logo on the remuneration vehicle in the image.

3. The electronic device of claim 1, wherein, to recognize the remuneration vehicle that is included in the image, the electronic processor is further configured to perform image recognition of a color and a shading of the remuneration vehicle in the image.

4. The electronic device of claim 1, wherein, to recognize the remuneration vehicle that is included in the image, the electronic processor is further configured to perform image recognition of a background image of the remuneration vehicle in the image.

5. The electronic device of claim 1, wherein, to recognize the remuneration vehicle that is included in the image, the electronic processor is further configured to perform image recognition of a unique number associated with the remuneration vehicle in the image.

6. The electronic device of claim 1, further comprising:
   a communication interface,
   wherein, to recognize the remuneration vehicle that is included in the image, the electronic processor is further configured to control the communication interface to perform electronic recognition of a radio frequency identifier (RFID) tag associated with the remuneration vehicle in the image.

7. The electronic device of claim 1, further comprising:
   a communication interface configured to communicate with a server via a network,
   wherein the memory includes the available resources repository, and
   wherein the electronic processor is further configured to
   periodically control the communication interface to request an update of the available resources associated with the remuneration vehicle,
   receive the update of the available resources associated with the remuneration vehicle,
   compare the update to any existing available resources that are stored in the available resources repository to determine changes in the available resources that are associated with the remuneration vehicle,
   control the memory to store the changes in the available resources repository.

8. The electronic device of claim 7, wherein the electronic processor is further configured to output a notification to the display screen that is indicative of the changes in the available resources associated with the remuneration vehicle.

9. The electronic device of claim 1, further comprising:
   a communication interface configured to communicate with a server via a network,
   wherein the memory includes the options repository, and
   wherein the electronic processor is further configured to periodically control the communication interface to request an update of the digital personalized offers associated with the remuneration vehicle,
receive the update of the digital personalized offers associated with the remuneration vehicle,
compare the update to any existing digital personalized offers that are stored in the options repository to determine changes in the digital personalized offers that are associated with the remuneration vehicle, and
control the memory to store the changes in the options repository.

10. The electronic device of claim 9, wherein the electronic processor is further configured to output a notification to the display screen that is indicative of changes in the digital personalized offers that are associated with the remuneration vehicle.

11. A non-transitory computer-readable medium storing instructions that, when executed by an electronic processor, cause the electronic processor to perform a set of operations, the set of operations comprising:
determining a location of the electronic device;
receiving an image including a remuneration vehicle from a camera;
recognizing the remuneration vehicle that is included in the image;
generating a graphical user interface including available resources and one or more options that are associated with the remuneration vehicle based on information stored in at least one of an available resources repository in a memory or an options repository in the memory;
generating an augmented reality image by overlaying the graphical user interface that is generated onto the image from the camera; and
sending, to a display screen, the augmented reality image to be displayed,
wherein the available resources include benefits that are associated with the remuneration vehicle, and
wherein the one or more options include digital personalized offers that are associated with the remuneration vehicle and are matched to the location of the electronic device.

12. The non-transitory computer-readable medium of claim 11, wherein recognizing the remuneration vehicle that is included in the image further includes performing image recognition of a logo on the remuneration vehicle in the image.

13. The non-transitory computer-readable medium of claim 11, wherein recognizing the remuneration vehicle that is included in the image further includes performing image recognition of a color and a shading of the remuneration vehicle in the image.

14. The non-transitory computer-readable medium of claim 11, wherein recognizing the remuneration vehicle that is included in the image further includes performing image recognition of a background image of the remuneration vehicle in the image.

15. The non-transitory computer-readable medium of claim 11, wherein recognizing the remuneration vehicle that is included in the image further includes performing image recognition of a unique number associated with the remuneration vehicle in the image.

16. The non-transitory computer-readable medium of claim 11, wherein recognizing the remuneration vehicle that is included in the image further includes controlling a communication interface to perform electronic recognition of a radio frequency identifier (RFID) tag associated with the remuneration vehicle in the image.

17. The non-transitory computer-readable medium of claim 11, wherein the set of operations further includes
periodically controlling a communication interface to request an update of the available resources associated with the remuneration vehicle from a server via a network;
receiving the update of the available resources associated with the remuneration vehicle from the server;
comparing the update to any existing available resources that are stored in the available resources repository to determine changes in the available resources that are associated with the remuneration vehicle; and
controlling the memory to store the changes in the available resources repository.

18. The non-transitory computer-readable medium of claim 17, wherein the set of operations further includes outputting a notification to the display screen that is indicative of the changes in the available resources associated with the remuneration vehicle.

19. The non-transitory computer-readable medium of claim 11, wherein the set of operations further includes
periodically controlling a communication interface to request an update of the digital personalized offers associated with the remuneration vehicle from a server via a network;
receiving the update of the digital personalized offers associated with the remuneration vehicle from the server;
comparing the update to any existing digital personalized offers that are stored in the options repository to determine changes in the digital personalized offers that are associated with the remuneration vehicle; and
controlling the memory to store the changes in the options repository.

20. A system comprising:
a server including
a first electronic processor; and
a first memory including a first available resources repository and a first options repository; and
an electronic device including
a camera;
a display screen;
a second memory including at least one of a second available resources repository or a second options repository; and
a second electronic processor communicatively connected to the second memory, the camera, and the display, the second electronic processor configured to
determine a location of the electronic device,
receive an image including a remuneration vehicle from the camera,
recognize the remuneration vehicle that is included in the image,
generate a graphical user interface including available resources and one or more options that are associated with the remuneration vehicle based on information stored in the at least one of the second available resources repository or the second options repository,
generate an augmented reality image by overlaying the graphical user interface that is generated onto the image from the camera, and
control the display screen to display the augmented reality image, wherein the at least one of the second available resources repository or the second options repository includes a portion of information stored in the first available resources repository or the first options repository,
wherein the available resources include benefits that are associated with the remuneration vehicle, and
wherein the one or more options include digital personalized offers that are associated with the remuneration vehicle and are matched to the location of the electronic device.

\* \* \* \* \*